(12) United States Patent
Akashi et al.

(10) Patent No.: US 9,810,863 B2
(45) Date of Patent: Nov. 7, 2017

(54) OPTICAL COMPONENT ASSEMBLY, OPTICAL RECEPTACLE, AND TRANSCEIVER MODULE FOR OPTICAL COMMUNICATIONS

(71) Applicant: KYOCERA Corporation, Kyoto (JP)

(72) Inventors: Tomoyoshi Akashi, Kyoto (JP); Tsuyoshi Tanaka, Kyoto (JP); Keisuke Takebe, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 30 days.

(21) Appl. No.: 14/758,793

(22) PCT Filed: Jul. 17, 2014

(86) PCT No.: PCT/JP2014/068998
§ 371 (c)(1),
(2) Date: Jun. 30, 2015

(87) PCT Pub. No.: WO2015/012183
PCT Pub. Date: Jan. 29, 2015

(65) Prior Publication Data
US 2015/0378107 A1    Dec. 31, 2015

(30) Foreign Application Priority Data

Jul. 26, 2013  (JP) .................... 2013-155455
Nov. 28, 2013 (JP) .................... 2013-245775
Mar. 26, 2014 (JP) .................... 2014-064433

(51) Int. Cl.
*G02B 6/42*    (2006.01)
*G02B 6/27*    (2006.01)
(Continued)

(52) U.S. Cl.
CPC ......... *G02B 6/4208* (2013.01); *G02B 6/2746* (2013.01); *G02B 6/387* (2013.01);
(Continued)

(58) Field of Classification Search
CPC ................ G02B 6/4263; G02B 6/3891
See application file for complete search history.

(56) References Cited

U.S. PATENT DOCUMENTS 5,297,227 A * 3/1994 Brown ............... G02B 6/3825
385/138
6,357,932 B1 * 3/2002 Auld .................. G02B 6/3891
385/56
(Continued)

FOREIGN PATENT DOCUMENTS

JP     57-030715 U    2/1982
JP     02-041202 U    3/1990
(Continued)

OTHER PUBLICATIONS

International Search Report dated Oct. 28, 2015 issued in counterpart International Application No. PCT/JP2014/068998.

*Primary Examiner* — Michelle R Connelly
(74) *Attorney, Agent, or Firm* — Procopio Cory Hargreaves and Savitch LLP (57) ABSTRACT

An optical component assembly includes a light-guiding member; a cylindrical member which retains the light-guiding member in a through hole thereof; and a projection which is provided at one end of the cylindrical member so as to extend beyond an outer periphery of the cylindrical member, and is engageable in a groove which is formed in a cylindrical shell so as to extend in an axial direction of the cylindrical shell and then turn at a distal end thereof in a circumferential direction of the cylindrical shell. By fixing the cylindrical shell to the projection, the cylindrical shell becomes attachable and detachable. It is possible to provide an optical receptacle and a transceiver module for optical communications having easy removal of foreign matters.

13 Claims, 5 Drawing Sheets

(51) Int. Cl.
  *H04B 10/40* (2013.01)
  *G02B 6/38* (2006.01)

(52) U.S. Cl.
  CPC ......... *G02B 6/3846* (2013.01); *G02B 6/3894* (2013.01); *G02B 6/421* (2013.01); *G02B 6/4207* (2013.01); *G02B 6/4246* (2013.01); *G02B 6/4263* (2013.01); *G02B 6/4292* (2013.01); *H04B 10/40* (2013.01); *G02B 6/3891* (2013.01)

(56) References Cited

U.S. PATENT DOCUMENTS

| | | | | |
|---|---|---|---|---|
| 2004/0247259 | A1* | 12/2004 | Blom | G02B 6/4292 385/92 |
| 2006/0159406 | A1 | 7/2006 | Nishie et al. | |
| 2007/0105432 | A1* | 5/2007 | Muhs | G02B 6/3879 439/492 |
| 2011/0085767 | A1* | 4/2011 | Miao | G02B 6/4201 385/93 |
| 2011/0170830 | A1* | 7/2011 | Uno | G02B 6/2746 385/88 |
| 2011/0189876 | A1* | 8/2011 | Schneider | G02B 6/3887 439/271 |

FOREIGN PATENT DOCUMENTS

| | | |
|---|---|---|
| JP | 11-174275 A | 7/1999 |
| JP | 2001-66468 A | 3/2001 |
| JP | 2003-280075 A | 10/2003 |
| JP | 2005-500556 A | 1/2005 |
| JP | 2006-119633 A | 5/2006 |
| JP | 2005-156968 A | 6/2006 |
| JP | 2006-190783 A | 7/2006 |
| JP | 2007-300021 A | 11/2007 |

* cited by examiner

OPTICAL COMPONENT ASSEMBLY, OPTICAL RECEPTACLE, AND TRANSCEIVER MODULE FOR OPTICAL COMMUNICATIONS

TECHNICAL FIELD

The present invention relates to an optical component assembly used for a connecting portion between separate optical fibers, an optical receptacle incorporating the optical component assembly, and a transceiver module for optical communications equipped with the optical component assembly, the optical receptacle, and a light-emitting device or a light-receiving device.

BACKGROUND ART

In the field of fiber-optic bidirectional communications, transceiver modules for optical communications are used. The transceiver module for optical communications is constructed by containing an optical transmitter and receiver circuit equipped with a light-emitting device such as an LD (laser diode) or a light-receiving device such as a PD (photodiode) in a compact package. The transceiver module for optical communications further includes an optical receptacle section attached to the casing of the compact package. By connecting an optical fiber to the optical receptacle section, communication between the transceiver module for optical communications and a counterpart transceiver module for optical communications is performed.

Figure 7:
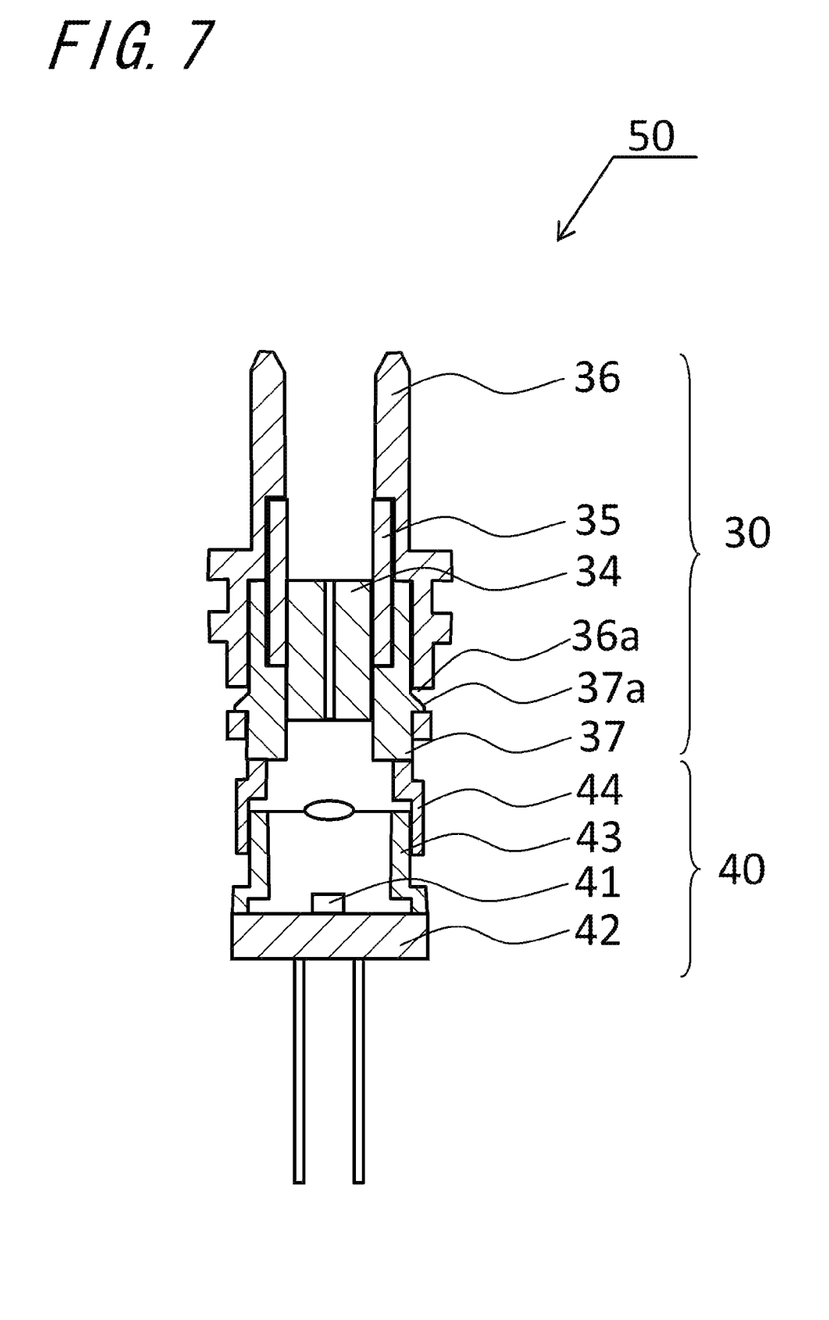
FIG. 7 is a sectional view showing an example of a conventional transceiver module for optical communications.

A schematic cross section of a conventional transceiver module for optical communications is shown in FIG. 7. The conventional transceiver module for optical communications 50 is composed of an optical receptacle 30 and an optical device unit 40.

The optical device unit 40 includes an optical device 41, which is a light-emitting device such as an LD or a light-receiving device such as a PD, stored in a casing composed of a device holder 42 and a device cover 43. The optical device unit 40 is secured, via a centering adapter 44, to a holder 37 of the optical receptacle 30.

The optical receptacle 30 comprises a fiber stub 34, a sleeve 35, a sleeve case 36, and a holder 37. An optical fiber is inserted into the fiber stub 34 so as to be located in a position corresponding to the center axis of the fiber stub 34. The holder 37 retains the fiber stub 34 therein, and covers the outer periphery of a lower part of the sleeve 35 for supporting the sleeve 35. The sleeve case 36 is secured to the holder 37 so as to cover the sleeve 35.

When an optical connector is connected to the optical receptacle 30, a ferrule disposed within the optical connector is guided by the sleeve 35 to cause the front end face of the ferrule to abut on the front end face of the fiber stub 34 in axial alignment with each other. This enables an optical fiber in the ferrule to abut on an optical fiber in the fiber stub 34, thus achieving optical signal connection.

The sleeve case 36 of the optical receptacle 30 is constructed of a resin molded product. The sleeve case 36 has a slim slit-like engagement hole 36a formed at a lower part thereof so as to extend circumferentially. On the other hand, the holder 37 has an engagement pawl 37a to hook in the engagement hole 36a. The sleeve case 36 is fastened to the holder 37 by pushing the sleeve case 36 into the holder 37 to effect an engagement between the engagement hole 36a and the engagement pawl 37a.

In the optical receptacle 30, since the sleeve case 36 is made of resin, the sleeve case 36 does not act as an antenna to receive noise. Moreover, the optical receptacle 30 can be produced at lower costs and assembled with ease.

SUMMARY OF INVENTION

Technical Problem

The conventional optical receptacle 30 is unfortunately not afforded sufficient protection against the entry of foreign matters. In the event of intrusion of foreign matters such as dirt into the interior of the sleeve case 36 or the sleeve 35, the optical axes of the ferrule of the counterpart and the fiber stub 34 may become misaligned, thus impairing optical connection. Furthermore, a foreign matter caught in the gap between an optical fiber in the ferrule of the counterpart and an optical fiber in the fiber stub 34 may lead to a failure in optical signal connection.

In the optical receptacle 30, however, once the sleeve case 36 and the holder 37 have been fitted to each other, separation between them is very difficult due to the engagement between the engagement hole 36a and the engagement pawl 37a. In fact, a cleanup of foreign matters has not been taken into consideration in the overall design of the conventional optical receptacle.

By force of necessity, removal of foreign matters has been carried out by a blow of compressed air, the use of a special-purpose cleaning kit, or otherwise, but, in such a case, the removal operation is not easy. Furthermore, development of a flaw in the fiber stub 34, the optical fiber, the sleeve 35 or the like caused by a cleanup process makes it difficult to restore normal connectability of the optical receptacle.

The invention has been devised in view of the problem as mentioned supra, and accordingly an object of the invention is to provide an optical component assembly adapted for an optical receptacle capable of easy restoration of connectability deteriorated by foreign matters or the like, and also provide an optical receptacle.

Solution to Problem

An optical component assembly in accordance with one embodiment of the invention comprises: a light-guiding member; and a cylindrical member which retains the light-guiding member in a through hole thereof. The cylindrical member has a projection which is provided at one end so as to extend beyond an outer periphery thereof, and is engageable in a groove which is formed in a cylindrical shell so as to extend in an axial direction of the cylindrical shell and then turn in a circumferential direction of the cylindrical shell.

In the optical component assembly, it is preferable that the projection is placed in two or more locations which are symmetrical with respect to a center axis of the cylindrical member.

Moreover, in the optical component assembly, it is preferable that the cylindrical member includes a protrusion which protrudes from one end face thereof and the projection is placed at a side face of the protrusion.

Moreover, in the optical component assembly, it is preferable that at least a part of a rear end face of the light-guiding member is an inclined face, and an inclination direction of the inclined face has a predetermined positional relationship with a protruding direction of the projection.

Moreover, in the optical component assembly, it is preferable that an optical isolator is located on an optical path of the light-guiding member.

Moreover, in the optical component assembly, it is preferable that a predetermined positional relationship is employed between the protruding direction of the projection and a direction of polarization plane of light transmitted through the optical isolator or a direction of polarization plane of light blocked by the optical isolator.

Moreover, in the optical component assembly, it is preferable that the light-guiding member is a fiber stub in which an optical fiber is inserted into a ferrule.

An optical receptacle in accordance with one embodiment of the invention comprises: the optical component assembly described above; a sleeve disposed at a front end part of the light-guiding member; and a cylindrical shell which covers an outer periphery of the sleeve, and has a groove which is formed at a rear end part of the cylindrical shell so as to extend in the axial direction of the cylindrical shell and then turn in the circumferential direction of the cylindrical shell, the cylindrical shell being fixable by engagement of the groove with the projection.

In the optical receptacle, it is preferable that a rear end face of the sleeve abuts on a front end face of the protrusion, and, a gap is present between the rear end face of the sleeve and the one end face of the cylindrical member.

Moreover, in the optical receptacle, it is preferable that a gap is present between the outer periphery of the cylindrical member and an inner periphery of the cylindrical shell.

Moreover, in the optical receptacle, it is preferable that a part of the groove which is turned in the circumferential direction of the cylindrical shell is an inclined groove which is away from a rear end face of the cylindrical shell with distance from a connection of the groove connected to a part of the groove which extends in the axial direction of the cylindrical shell to a distal end of the groove.

Moreover, in the optical receptacle, it is preferable that the cylindrical shell is provided with a marking for identification.

Moreover, in the optical receptacle, it is preferable that the marking is represented by a color different from a color of the appearance of the cylindrical shell.

Moreover, in the optical receptacle, it is preferable that the marking is represented by a mark engraved in the cylindrical shell.

Moreover, in the optical receptacle, it is preferable that the marking is represented by a color painted onto the cylindrical shell.

A transceiver module for optical communications in accordance with one embodiment of the invention comprises: any one of the optical receptacles described above; and an optical communications package secured to the cylindrical member, in the optical communications package being stored an optical device.

A transceiver module for optical communications in accordance with one embodiment of the invention comprises: any one of the optical component assemblies described above; and an optical communications package secured to the cylindrical member, in the optical communications package being stored an optical device.

Advantageous Effects of Invention

According to one embodiment of the invention, the optical component assembly comprises: a light-guiding member; a cylindrical member which retains the light-guiding member in a through hole thereof; and the projection which is provided at one end of the cylindrical member so as to extend beyond the outer periphery of the cylindrical member, and is engageable in the groove which is formed in a cylindrical shell so as to extend in an axial direction of the cylindrical shell and then turn in a circumferential direction of the cylindrical shell. This construction makes it possible to facilitate the attachment and detachment of the cylindrical shell, and thereby uncover the light-guiding member readily for smooth removal of foreign matters.

In the optical component assembly, the projection is placed in two or more locations which are symmetrical with respect to a center axis of the cylindrical member. This allows the cylindrical shell to be fixed with stability.

Moreover, in the optical component assembly, the cylindrical member includes a projection which extends from one end face thereof and the projection is placed at the side face of the protrusion. This makes it possible to constitute the projection readily with high machining accuracy.

Moreover, in the optical component assembly, at least a part of the rear end face of the light-guiding member is an inclined face, and, an inclination direction of the inclined face has a predetermined positional relationship with a protruding direction of the projection. This makes it possible to determine the direction of inclination of the inclined face on the basis of the protruding direction of the projection.

Moreover, in the optical component assembly, the optical isolator is located on an optical path of the light-guiding member. This makes it possible to render the optical path of the optical component assembly an optical path for passing optical signals in one direction.

Moreover, in the optical component assembly, a predetermined positional relationship is employed between the protruding direction of the projection and a direction of polarization plane of light transmitted through the optical isolator or a direction of polarization plane of light blocked by the optical isolator. This makes it possible to fix the optical isolator while checking polarization plane direction on the basis of the protruding direction of the projection, and thereby facilitate the assembling operation of the optical component assembly.

Moreover, in the optical component assembly, the light-guiding member is a fiber stub in which an optical fiber is inserted into a ferrule. This makes it possible to attain excellent connection characteristics.

According to one embodiment of the invention, the optical receptacle comprises: the optical component assembly described above; the sleeve disposed at a front end part of the light-guiding member; and the cylindrical shell which covers an outer periphery of the sleeve, and has a groove which is formed at a rear end part of the cylindrical shell so as to extend in the axial direction of the cylindrical shell and then turn in the circumferential direction of the cylindrical shell, the cylindrical shell being fixable by engagement of the groove with the projection. Easy detachment of the cylindrical shell helps facilitate removal of foreign matters.

In the optical receptacle, the rear end face of the sleeve abuts on a front end face of the protrusion, and, a gap is present between the rear end face of the sleeve and the one end face of the cylindrical member. This helps facilitate the attachment and detachment of the sleeve.

Moreover, in the optical receptacle, a gap is present between the outer periphery of the cylindrical member and an inner periphery of the cylindrical shell. This makes it possible to render the optical receptacle less prone to fluctuations in optical output.

Moreover, in the optical receptacle, a part of the groove which is turned in the circumferential direction of the cylindrical shell is an inclined groove which is away from a rear end face of the cylindrical she with distance from a connection of the groove connected to a part of the groove which extends in the axial direction of the cylindrical shell to a distal end of the grove. This allows the optical receptacle to hold the cylindrical shell firmly.

Moreover, in the optical receptacle, the cylindrical shell is provided with a marking for identification. In this case, for example, the optical receptacle is distinguishable for use in an intended application.

Moreover, in the optical receptacle, the marking is represented by a color different from a color of the appearance of the cylindrical shell. In this case, the optical receptacle can be identified by the color applied by printing, for example.

Moreover, in the optical receptacle, the marking is represented by a mark engraved in the cylindrical shell. In this case, the optical receptacle can be identified by the engraved mark.

Moreover, in the optical receptacle, the marking is represented by a color painted onto the cylindrical shell. In this case, the optical receptacle can be identified by the color of the cylindrical shell.

According to one embodiment of the invention, the transceiver module for optical communications includes any one of the optical receptacles or optical component assemblies described above, and is thus capable of easy removal of foreign matters.

DESCRIPTION OF EMBODIMENTS

The following describes embodiments of the invention with reference to drawings. The same names and reference signs refer to corresponding parts throughout the drawings.

Figure 1:
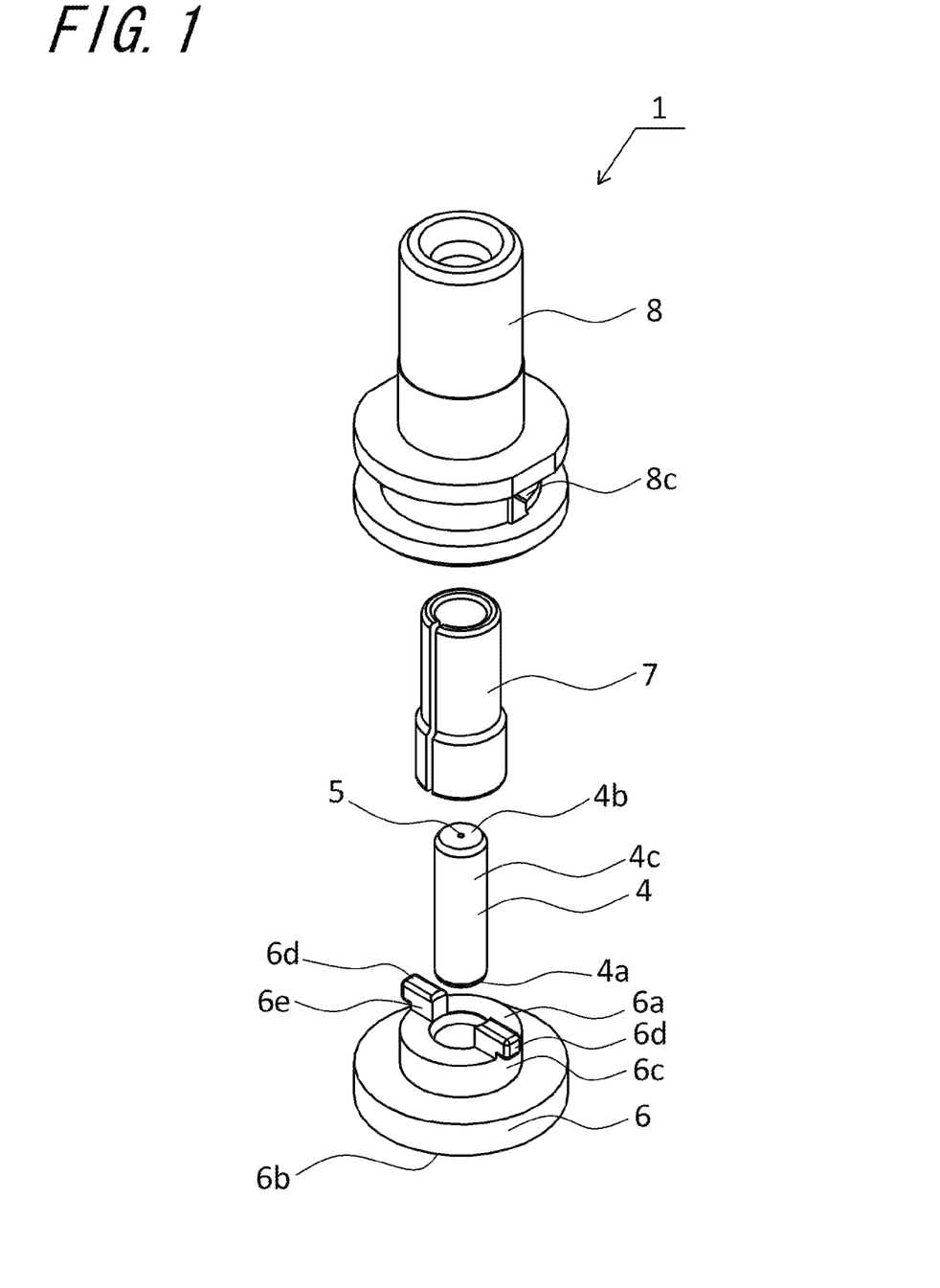
FIG. 1 is an exploded perspective view showing an optical component assembly and an optical receptacle in accordance with one embodiment of the invention.
Figure 2:
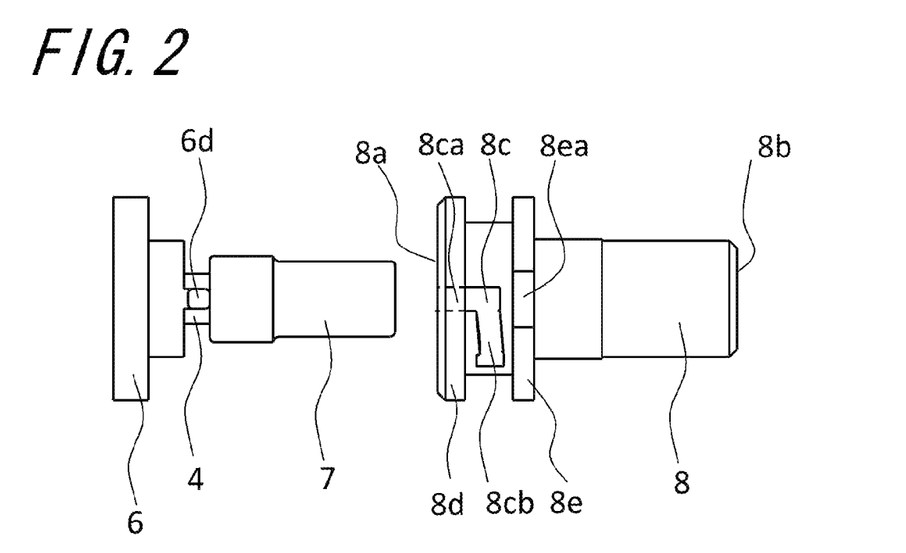
FIG. 2 is a partially-disassembled side view of the optical component assembly and the optical receptacle in accordance with one embodiment of the invention.
Figure 3:
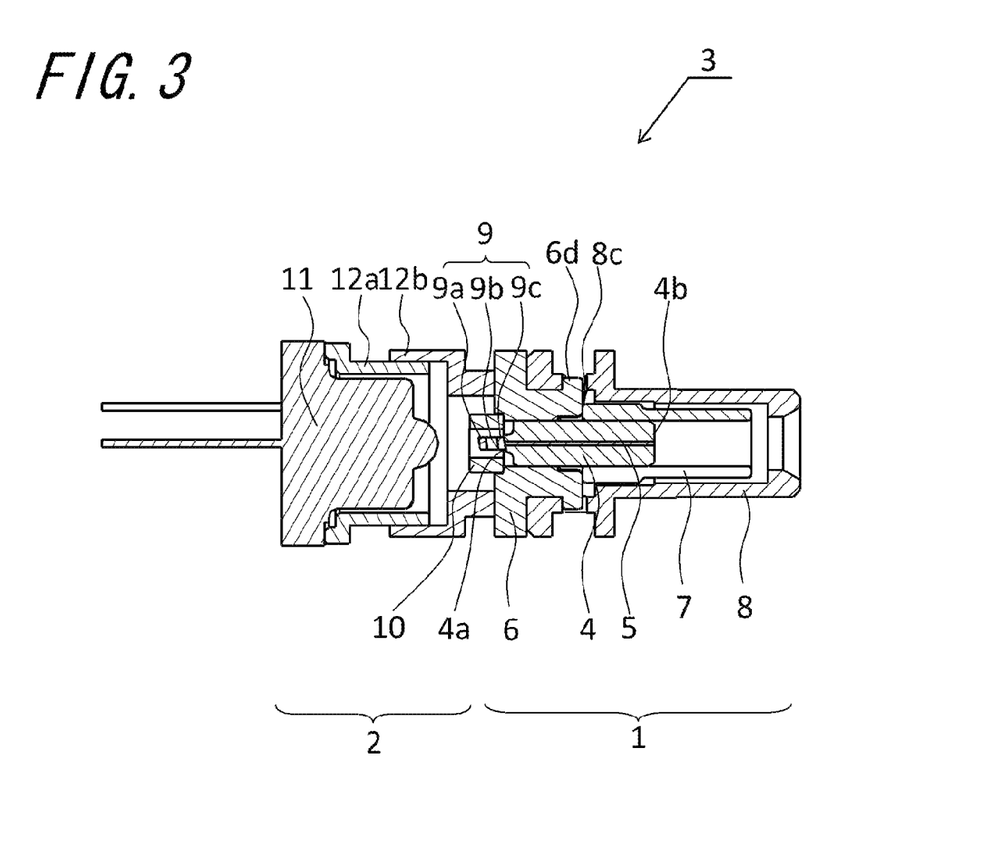
FIG. 3 is a sectional view showing an embodiment of a transceiver module for optical communications pursuant to the invention.

FIG. 1 is an exploded perspective view showing an embodiment of an optical receptacle 1 pursuant to the invention. FIG. 2 is a side view of the optical receptacle 1, illustrating a cylindrical member 6, a light-guiding member (fiber stub) 4, and a sleeve 7 in assembled relation, and a shell 8 in a disassembled state. FIG. 3 is a sectional view of a transceiver module for optical communications 3 comprising the optical receptacle 1, illustrating its section including a center axis. In FIG. 3, an optical communications package 11 or a package for optical communications 11 is shown cross-hatched, and a detailed internal structure thereof is thus omitted.

In the present embodiment, the optical receptacle 1 includes an optical component assembly, which is an assemblage of a light-guiding member 4 and a cylindrical member 6. The optical receptacle 1 is constructed by assembling a sleeve 7 and a shell 8 to the optical component assembly.

The cylindrical member 6 is produced by the working of metal, ceramics resin or the like. The cylindrical member 6 is in the general form of a cylinder having a through hole formed at a center axis thereof. At one end 6a, the cylindrical member 6 has a projection 6d extending outward beyond an outer periphery 6c. Moreover, at the other end 6b, the cylindrical member 6 may have a flange portion having a large outside diameter.

In the embodiment of the invention shown in FIGS. 1 and 2, at the end face of one end 6a of the cylindrical member 6, a protrusion 6e which protrudes in an axial direction of the cylindrical member 6 is disposed. A side face of the protrusion 6e is continuous with the outer periphery 6c, and is thus formed as part of the outer periphery 6c. The projection 6d is formed so as to project from the side face of the protrusion 6e outwardly beyond the outer periphery 6c.

Figure 4:
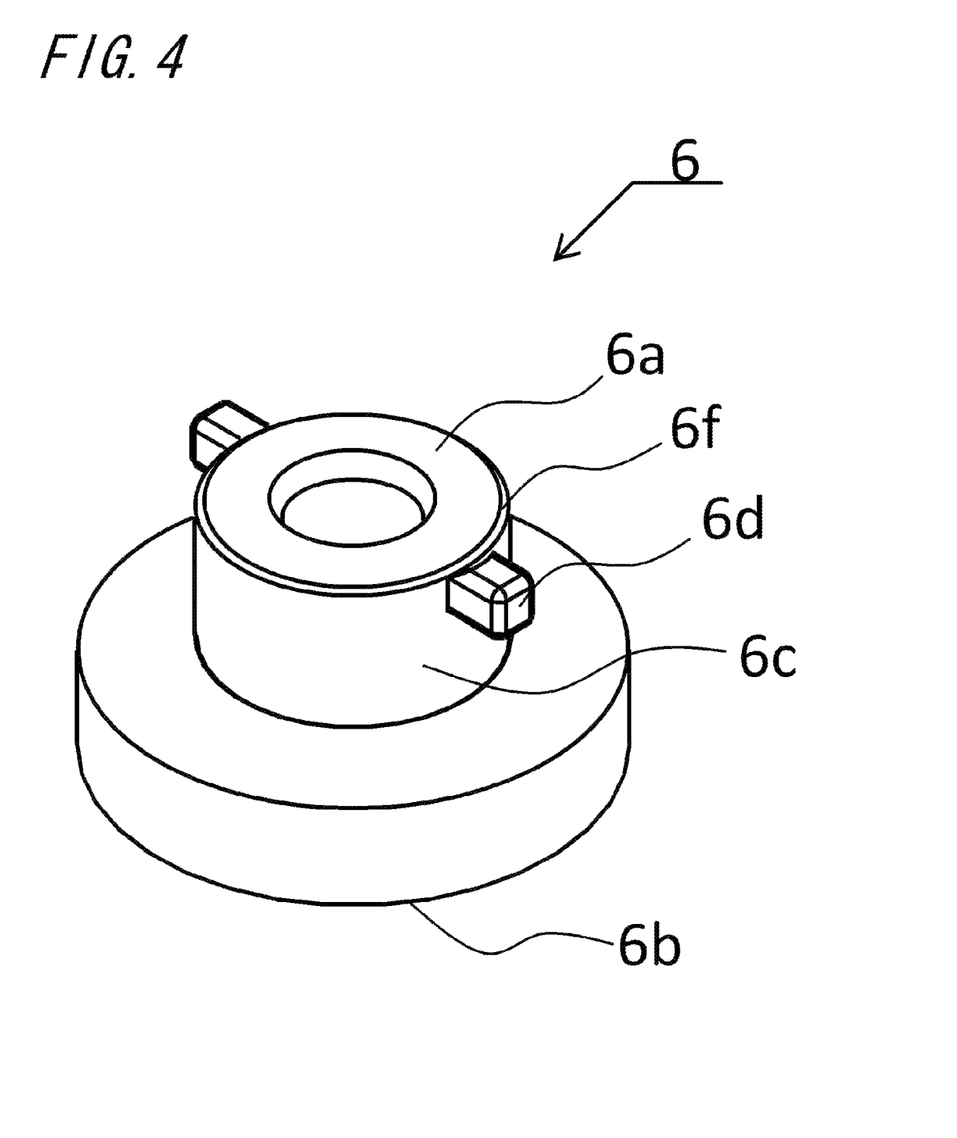
FIG. 4 is a perspective view showing another embodiment of the optical component assembly of the invention.

As shown in FIG. 4, the projection 6d may be formed so as to project simply from the outer periphery 6c at one end 6a of the cylindrical member 6. In forming the protrusion 6e and the projection 6d as shown in FIGS. 1 and 2, part of the surface of one end 6a of the cylindrical member 6 shown in FIG. 4 is cut in a downward direction while leaving a portion for constituting the protrusion 6e. In reality, the cylindrical member 6 is, while being rotated about the center axis, machined into a form with a flange having an outside diameter conforming to the protruding height of the projection 6d. After that, the surface of one end 6a is partly cut in the axial direction while leaving portions for constituting the protrusion 6e and the projection 6d. In this way, the protrusion 6e and the projection 6d can be formed with ease in the cylindrical member 6.

It is preferable that the projection 6d is placed on the outer periphery 6c in two or more locations which are symmetrical with respect to the axis of the cylindrical member 6. When a plurality of projections 6d are provided, it is preferable that the projections 6d are arranged in locations dividing the outer periphery 6c equally. For example, when three projections 6d are provided, it is preferable that the projections 6d are located at vertex positions of an equilateral triangle in which an angle 120° is formed between adjacent vertex positions. In the case shown in FIGS. 1 and 4, the projection 6d is placed in two locations about the center axis of the cylindrical member 6. It is desirable to provide such projections 6d in at least two positions. This helps fasten the shell 8 with stability, and also fasten the shell 8 while restraining the axis of the shell against inclination.

The light-guiding member 4 has light-transmittable properties. Although a fiber stub 4 is adopted as the light-guiding member in the case shown in FIGS. 1, 2 and 3, for example, a glass plate, a glass molded product, or a transparent crystallization body may be used. The fiber stub 4 is constructed by inserting an optical fiber 5 into a cylindrical ferrule through its center hole so as run from a rear end 4a to a front end 4b of the ferrule. The following describes the case where the fiber stub 4 is used as the light-guiding member 4, and the light-guiding member 4 will thus be also referred to as the fiber stub 4.

The fiber stub 4 comprises a stub ferrule 4c and the optical fiber 5 inserted therein. The stub ferrule 4c is a metal body or electrically insulating body which is shaped in a cylinder and has a narrow through hole formed in a position of a center axis thereof. The optical fiber 5 is inserted, through this hole, into the stub ferrule 4c throughout a length thereof. The rear end part, including the rear end face 4a, of the fiber stub 4 is force-fitted, bonded, or otherwise into an inner hole of the cylindrical member 6, thus retaining the fiber stub 4 in the cylindrical member 6.

It is preferable that at least a part of the rear end face 4a of the fiber stub 4 is an inclined face inclined with respect to a plane perpendicular to the axis of the fiber stub 4. The part of the rear end face 4a constituting the sloping face involves the end face for incidence and exit of light of the optical fiber 5. The rear end face 4a of the fiber stub 4 shown in FIG. 3, which is the end face of a part protruding from the midportion of the end face of the fiber stub 4, is inclined as an inclined face.

It is preferable that the fiber stub 4 is secured to the cylindrical member 6 so that a predetermined positional relationship is employed between an inclination direction of the rear end face 4a and a protruding direction of the projection 6d. For example, the fiber stub 4 as shown in FIG. 3 is secured to the cylindrical member 6 so that the inclination direction of the rear end face 4a is parallel to the protruding direction of the projection 6d. This makes it possible to check the inclination direction of the inclined face of the fiber stub 4 from the outside on the basis of the protruding direction of the projection 6d.

An optical isolator 9 may be placed at the rear end face 4a of the fiber stub 4. For example, the optical isolator device 9 is constructed by bonding a polarizer 9a, a Faraday rotator 9b, and an analyzer 9c sequentially in the order named. These components are adhesively bonded together after rotating the polarizer 9a and the analyzer 9c in axial alignment with each other to set the angle of the polarization plane of transmitted light at 45°. The combined body is cut into a rectangular-prism form which is small enough to fit inside the outer periphery of the rear end face 4a of the fiber stub 4.

The optical isolator device 9 thus secured to the rear end face 4a of the fiber stub 4 by adhesion or otherwise. Upon putting a drop of an adhesive in liquid form onto the rear end face 4a of the fiber stub 4, the adhesive wettably spreads over the rear end face 4a, forming a lump by the surface tension of the liquid adhesive. When the optical isolator device 9 is placed on this adhesive, it is easy to align the optical isolator device 9 since the optical isolator device 9 is moved to the center of the rear end face 4a by the surface tension of the adhesive, then tightly pressed the isolator device against the rear end face 4a at that position and the adhesive is cured. Since the end face of the optical fiber 5 is located at the center of the rear end face 4a, it follows that the optical isolator 9 lies on an optical path of the fiber stub 4.

It is sufficient that the optical isolator device 9 is located on the optical path of the fiber stub 4. Although the optical isolator device 9 is placed at the rear end face 4a in the aforestated embodiment, for example, a groove crossing the optical fiber 5 may be disposed at a central portion of the fiber stub 4 in the axial direction thereof, and the optical isolator device 9 may be placed in the groove.

Moreover, as shown in FIG. 3, it is advisable that the optical isolator device 9 is shaped in a parallelepiped in which an incidence face and an exit face are inclined at a predetermined angle conforming to the inclination angle of the rear end face 4a with respect to a plane perpendicular to the optical axis, and side faces are parallel to the optical axis. Since the rear end face 4a is a face inclined with respect to a plane perpendicular to the optical axis, the rear end face 4a has an elliptical shape in this case. It is advisable that the light incidence and exit faces of the optical isolator device 9 are rectangular-shaped, and the optical isolator device 9 is attached so that, for example, a long side of the rectangle defining the incidence and exit faces coincides with a direction of the major axis of the ellipse defining the rear end face 4a, where the long side of the rectangle has a predetermined angular relationship with the angle of polarization.

It is also advisable that the optical isolator device 9 is attached to the rear end face 4a so that the direction of the long side and the direction of the projection 6d are uniform in orientation. This makes it possible to determine the angle of a polarization plane in the optical isolator device 9 with ease by looking at the protruding direction of the projection 6d. A magnet 10 may be placed around the optical isolator device 9 to apply a magnetic field to the Faraday rotator 9b. In a precise sense, a combination of the optical isolator device 9 and the magnet 10 may refer to the optical isolator 9, but rigid distinction between them is not made herein.

The optical component assembly thus assembled is joined, via centering adapters 12a and 12b, to the package for optical communications 11 which stores an optical device therein, thus completing a transceiver module for optical communications pursuant to the invention. In the joining process, optical alignments are made to achieve optical coupling between the optical device and the optical fiber 5.

Alternatively, there may be a case where the sleeve 7 and the shell 8 are secured to the optical component assembly to form an optical receptacle 1, and thereafter the optical receptacle 1 is joined to the package for optical communications 11 which stores an optical device therein via the centering adapters 120 and 12b. Also in this case, as the optical receptacle 1 is moved in X, Y, and Z directions, and at a position for achieving optical coupling between the optical device and the optical fiber 5, the centering adapters 12a and 12b, the cylindrical member 6, and the package for optical communications 11 are fixed by joining together by YAG welding or otherwise. In this way, the transceiver module for optical communications of the invention is completed.

The optical receptacle 1 is completed by mounting the sleeve 7 and the shell 8 to the optical component assembly in the following manner.

The sleeve 7 having a cylindrical shape is fixed by fitting over the fiber stub 4 so that the rear end (lower end as seen in FIG. 1) covers the front end 4b (upper end as seen in FIG. 1) of the fiber stub 4. Although not shown in the drawings, a front end part of a plug ferrule with an optical fiber inserted therein is inserted in an interior of the front end (upper end as seen in FIG. 1) side tubular part of the sleeve 7, and, the front end face of the plug ferrule butts against the front end face 4b of the fiber stub 4. This enables the optical fiber 5 disposed within the fiber stub 4 and the optical fiber disposed within the plug ferrule to be butt-connected to each other in coaxial relation.

It is preferable that a split sleeve 7 formed with an axially extending slit is used as the sleeve 7. The split sleeve 7 has an inside diameter which is slightly smaller than the outside diameter of the fiber stub 4 or the plug ferrule. By inserting the fiber stub 4 or the plug ferrule into the split sleeve 7 from either end, the slit is expanded, thus increasing the inside diameter of the split sleeve 7. Moreover, under the elastic force of the split sleeve 7, the fiber stub 4 and the plug ferrule are held in coaxial relation. Thus, the sleeve 7 is brought into intimate contact with the outer periphery of the fiber stub 4 and the plug ferrule under the elastic force, and, the fiber stub 4 and the plug ferrule can be held only with a small clearance. This makes it possible to achieve efficient optical coupling of light transmitted through the interior of the fiber stub 4 and the optical fiber inserted in the plug ferrule.

It is preferable that the sleeve 7 is inserted until it reaches a position where its rear end face abuts on the front end face of the protrusion 6e. In the case of using the cylindrical member 6 as shown in FIG. 4, it is preferable that the sleeve 7 is inserted until it reaches a position where the rear end face abuts on the front end face 6a of the cylindrical member 6 having a chamfer 6f formed at its outer periphery.

As described above, since the sleeve 7 is tightly secured to the fiber stub 4 only with a small clearance, the sleeve 7 does not become dislodged easily. However, as the need for replacement of the sleeve 7 comes about after it fixedly abuts on the front end face of the protrusion 6e or the front end face of the cylindrical member 6, the sleeve 7 can be readily dismounted with safety by inserting some tool into a gap created between the rear end face of the sleeve 7 and the cylindrical member 6. For example, as is understood from FIG. 2, by fixing the sleeve 7 while causing its rear end face to abut on the front end face of the protrusion 6e, a gap can be created between the rear end face of the sleeve 7 and the surface of one end 6a of the cylindrical member 6. The tool can be inserted into this gap.

Moreover, by fixing the sleeve 7 while causing its rear end face to abut on the front end face of the protrusion 6e or the front end face 6a of the cylindrical member 6, the length of insertion of the sleeve 7 over the fiber stub 4 can be controlled with ease.

The shell 8 covers on an outside of the sleeve 7 to protect the sleeve 7, as well as to prevent the sleeve 7 from coming off from the fiber stub 4. The shell 8 may be made of a resin or metal molded product. Since resin is an inexpensive electrically insulating material having good moldability, resin is suitable for use in forming the shell 8 of the present embodiment.

As shown in FIG. 2, the shell 8 includes an L-shaped groove 8c composed of a groove 8ca formed on a rear end 8a side so as to extend in an axial direction of the shell 8 and a groove 8cb formed so as to extend from a distal end of the groove 8ca in a circumferential direction of the shell 8. The projection 6d of the cylindrical member 6 is engaged with the groove 8c, thus securing the shell 8 to the cylindrical member 6.

That is, the cylindrical member 6 and the shell 8 are secured to each other by a so-called bayonet mounting method. The projection 6d serves as a pawl or a radial pin, and the groove 8c serves as an L-shaped slot. After the projection 6d is positioned in alignment with the end of the axially extending groove 8ca, the shell 8 is covered and inserted over the fiber stub 4 and the sleeve 7 in the axial direction. When the projection 6d reaches the distal end of the groove 8ca, the shell 8 is rotated to slide the projection 6d along the circumferentially extending groove 8cb, and the shell 8 is operated to keep on rotating until the projection 6d reaches a distal end of the groove 8cb. At the distal end of the groove 8cb, the groove 8cb is slightly widened toward the rear end of the shell 8, so that the projection 6d falls into the widened part and held in place.

It is preferable that the groove 8cb is slightly inclined in a direction away from the rear end 8a of the shell 8 from the part connected to the groove 8ca to the distal end of the groove 8cb. In this case, as the shell 8 is rotated, the surface of the rear end 8a of the shell 8 is pressed against the cylindrical member 6, thus achieving mutual securement. Moreover, a stress acting repulsively on a compressive force applied to the shell 8 serves as a spring force to secure the shell 8 to the cylindrical member 6.

It is preferable that the diameter of the inner periphery of the shell 8 is 0.001 mm to 0.1 mm larger than the diameter of the outer periphery 6c of the cylindrical member 6. This creates a gap between the outer periphery 6c of the cylindrical member 6 and the inner periphery of the shell 8. The creation of such a moderate gap allows improvement in optical output fluctuations in the optical receptacle, which are so-called wiggle characteristics.

Figure 5:
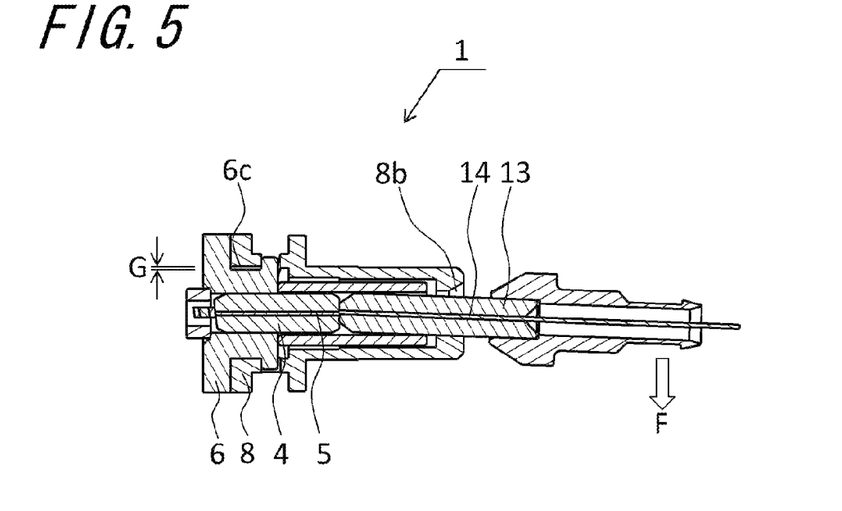
FIG. 5 is a sectional view for explaining fluctuations in optical output from the optical receptacle of the invention.

FIG. 5 is a sectional view for explaining fluctuations in optical output that occur when a plug ferrule 13 is connected to the optical receptacle 1. When a downward lateral load F is applied to the plug ferrule 13, the plug ferrule 13 is moved so as to rotate about an opening at the front end 8b of the shell 8 acting as a pivot, thus causing the front end of the plug ferrule 13 to displace upward relative to the front end of the fiber stub 4.

In this regard, in the optical receptacle 1, the shell 8 is retained only by the engagement between the projection 6d and the groove 8c. Thus, in the presence of the gap between the outer periphery 6c of the cylindrical member 6 and the inner periphery of the shell 8, the shell 8, in its entirety, is moved in the direction of application of the load F, wherefore a gap G is created, and also the pivot defined by the opening at the front end 8b is shifted downward. The shift of the pivot makes it possible to reduce the amount of displacement of the front end of the plug ferrule 13 relative to the fiber stub 4, and thereby achieve improvement in wiggle characteristics.

Moreover, the use of an elastic resin for the shell 8 is also conducive to improvement in wiggle characteristics. It is confirmed that when a load of 1.1 N was applied to a part of the plug ferrule 13 which part is spaced 27 mm away from the front end of the plug ferrule 13 under a condition where the difference between the inside diameter of the shell 8 and the outside diameter of the outer periphery of the cylindrical member 6 was set at 0.03 mm, optical output fluctuations can be reduced to a level of 0.2 to 0.3 dB as compared to an optical receptacle constructed by force-fitting a metallic shell into a metallic holder.

In the present embodiment, as shown in FIGS. 1 and 2, two flange-shaped protrusions 8d and 8e are formed on the rear end 8a side of the shell 8. That part of the groove 8c which lies in a protrusion 8d, 8e-bearing area of the shell 8 is formed as a U-shaped bottomed groove, whereas that part of groove 8c which lies an protrusion 8d, 8e-free area of the shell 8 is formed as a slot-like hole. The groove 8c may be either formed as a slot 8C passing all the way through from the inside to the outside of the shell 8, or formed as a groove at one part, and as a slot at the other part as practiced in the present embodiment.

Moreover, a cutaway 8ea is formed in the protrusion 8e of the shell 8. The formation of the cutaway 8ea allows easy confirmation of the position of the groove 8c. The cutaway 8ea may also serve as a marking for identification of the shell 8.

There may be a case where a plurality of optical receptacles 1 or transceiver modules for optical communications 3 are arranged in parallel for use. For example, two types of transceiver modules for optical communications 3, namely TOSA (Transmitter Optical Sub-Assembly) and ROSA (Receiver Optical Sub-Assembly), may be juxtaposed in an optical transceiver. In this case, formation of a marking in each shell 8 for identification allows easy distinction between the TOSA transceiver module for optical communications 3 and the ROSA transceiver module for optical communications 3. Moreover, when the optical transceiver has a plurality of channels, channel identification can be made readily simply by checking the shells 8.

Since the shell 8 is placed in a position close to the junction of the optical receptacle 1 to which is connected an optical connector incorporating a plug ferrule, the shell 8 lends itself well to application of such a marking. Moreover, since the shell 8 can be mounted lastly following the completion of assembly of the transceiver module for optical communications 3, even after the assembly of the optical transceiver, a suitable shell 8 can be mounted to the transceiver module for optical communications 3 in accordance with its application for module identification.

The markings may be mutually identifiable, and various ways may be adopted. As exemplified in FIG. 6, the marking can be made by printing a character or a symbol onto a marking region 8*f*. More positive identification can be achieved by using characters or symbols of different colors. Moreover, a character or a symbol may be engraved on the marking region 8*f*. Alternatively, a seal bearing a character or a symbol may be placed on the marking region 8*f*. The seals may have different background colors, and also characters or symbols of different colors may be used in combination for the seals.

Figure 6:
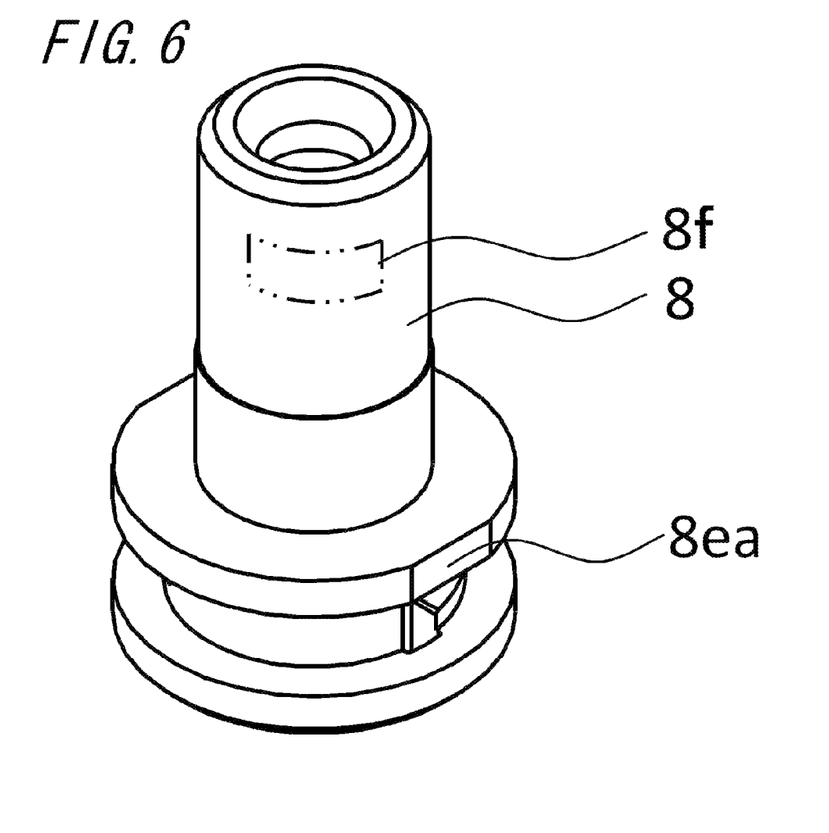
FIG. 6 is a perspective view showing another embodiment of a shell for use in the optical receptacle of the invention.

In the method of identification by engraving, a method of using the cutaway 8*ea* is included. The shells 8 that differ from one another in the position of the cutaway 8*ea* or in the number of the cutaways 8*ea* can be identified by the cutaways 8*ea* serving as markings for identification.

The shells 8 may be made to have different background colors for identification. In this case, for example, a shell 8 having a reddish background color is assigned to TOSA, whereas a shell 8 having a bluish background color is assigned to ROSA, thus permitting a distinction between TOSA and ROSA.

The position of the marking region 8*f* shown in FIG. 6 is given merely by way of example, and the marking region 8*f* can thus be formed in other ideal position on the outer periphery of the shell 8. The advantage of the use of a printed character or symbol for the marking is the capability of indicating many pieces of information in an easy-to-understand manner. In the case of producing the shell 8 by molding, the advantage of engraving is that the marking can be engraved in the mold in advance. Moreover, the advantage of making the shells 8 to have different background colors is the simplicity of using materials of different colors.

The marking can also be made by using the above-described methods in combination. In the case of making the shells 8 to have different background colors, coloring materials used for the shells 8 are preferably selected from among those capable of rendering the shells 8 semitransparent. The use of transparent or semitransparent materials for constituting the shells 8 helps facilitate the mounting of the shells 8, and also permits easy checking of the condition of installation of the sleeve 7 inside the shell 8.

Next, exemplary of materials and manufacturing methods adopted for the optical component assembly and the optical receptacle 1 of the present embodiment will be described below.

The outside diameter of the fiber stub 4 is determined depending upon the outside diameter of a plug ferrule of an optical connector which butts against the fiber stub 4. A plug ferrule having an outside diameter of about 1.25 mm is used for an optical connector of MU or LC type; a plug ferrule having an outside diameter of about 2.5 mm is used for an optical connector of SC, FC, or ST type; and a plug ferrule having an outside diameter of about 2.0 mm is used for an optical connector of D4 type. The fiber stub 4 in use has basically the same outside diameter as the corresponding plug ferrule.

Metal, a plastic material such as epoxy resin or liquid crystal polymer resin, or a ceramic material such as alumina ceramics or zirconia ceramics is used for the ferrule of the fiber stub 4. It is preferable that the ferrule is made of zirconia ceramics from the standpoint of mechanical performance capability. More specifically, it is preferable that the ferrule is made of partially-stabilized zirconia ceramics that is composed predominantly of $ZrO_2$, contains at least one of $Y_2O_3$, CaO, MgO, $CeO_2$, and $Dy_2O_3$ as a stabilizer, and principally crystallizes in the tetragonal system. Since the partially-stabilized zirconia ceramics has excellent wear and abrasion resistance and is elastically deformable to an adequate extent, the partially-stabilized zircon ceramics has an advantage in securing the ferrule to the cylindrical member 6.

In the case of using zirconia ceramics, for example, the ferrule of the fiber stub 4 is produced by obtaining a cylindrical or rectangular prism-shaped molded body using a zirconia ceramics raw material by a predetermined molding technique such as injection molding, pressure molding, or extrusion molding, firing the molded body at a temperature of 1300° C. to 1500° C., and then machining or polishing the outer periphery of the fired body in conformity with predetermined dimensions of the fiber stub 4. Alternatively, a green molded body may be machined or otherwise into a predetermined configuration and thereafter the machined green molded body may be fired.

In the fiber stub 4, the front end face 4*b* is ground into a curved face having a radius of curvature of about 5 to 30 mm by means of mirror grinding to reduce splice loss between itself and the plug ferrule of the optical connector, and the rear end face 4*a* together with the end face of the optical fiber 5 is ground into a face inclined at an angle of about 4° to 10° with respect to a plane perpendicular to the axis of the fiber stub 4 to prevent light emitted from an optical device such as a LD (laser diode) from being reflected from the end face of the optical fiber 5 to eventually return to the optical device as reflection light.

The sleeve 7 is made of a material such as zirconia ceramics, alumina ceramics, or copper. Ceramic materials such as zirconia ceramics, are frequently used in view of wear and abrasion resistance. In the case of using a ceramic material such as zirconia, for example, like the way to form the fiber stub 4, the sleeve 7 is produced by obtaining a tubular or cylindrical molded body for constituting the sleeve 7 by a predetermined molding technique such as injection molding, pressure molding, or extrusion molding, firing the molded body at a temperature of 1300° C. to 1500° C., and thereafter machining or polishing the fired body into predetermined dimensions. Alternatively, a green molded body may be machined or otherwise into a predetermined configuration and thereafter the machined green molded body may be fired.

In the case of adopting the split sleeve 7 as the sleeve 7, an axially extending slit is made in the fired body by machining operation. The surface roughness of the inside of the sleeve 7 is preferably less than or equal to 0.2 μm in terms of arithmetic average roughness (Ra) with consideration given to insertability. It is desirable that the tolerance between the outside diameter of the fiber stub 4 and the inside diameter of the sleeve 7 is less than or equal to ±1 μm to reduce splice loss. Moreover, it is desirable that the sleeve 7 is designed to have an inside diameter which permits of firm retention of the fiber stub 4 under an insertion force of greater than or equal to 0.98 N.

The cylindrical member 6 is made of a material such as stainless steel, copper, iron, nickel, plastics, zirconia ceramics, or alumina ceramics. The use of a metal material is preferable from the standpoint of workability and elasticity, and, in particular, stainless steel materials are frequently used. The cylindrical member 6 is produced by machining a metallic wire rod having a thickness which is greater than the outside diameter of the cylindrical member 6 by means of lathe working or otherwise.

The shell 8 is made of a plastic material such as polyether imide, polysulfone, or polyphenylene sulfide, or a metal material such as stainless steel, copper, iron, or nickel. In view of moldability, it is preferable that the shell 8 is formed by subjecting a plastic material such as the aforementioned polyether imide to injection molding.

The optical component assembly is fixed by force-fitting the rear end 4a of the fiber stub 4 into the inner hole of the cylindrical member 6 while applying pressure to the front end 4b of the fiber stub 4. One side of the inner hole of the cylindrical member 6 toward one end 6a is provided with a portion having a thickness which is greater than the outside diameter of the fiber stub 4 for adjustment of the force-fitted length of the fiber stub 4.

To achieve further assembly to complete the optical receptacle 1, the sleeve 7 is inserted over the front end 4b of the fiber stub 4, and subsequently the shell 8 is inserted over the sleeve 7 to cover the sleeve 7 in the aforestated manner and is fixed by the bayonet mounting method.

Then, the centering adapters 12a and 12b are joined to the optical component assembly or the cylindrical member 6 of the optical receptacle 1, and the package for optical communications 11 which stores an optical device therein is held in place, thus producing the transceiver module for optical communications 3 of the invention. Before the centering adapters 12a and 12b are joined, the optical receptacle 1 or the optical component assembly is moved in the X, Y, and Z directions at a position for achieving optical coupling between the optical device disposed within the package for optical communications 11 and the optical fiber 5. After that, the centering adapters 12a and 12b are fixed in position by YAG welding or otherwise. In this way, the transceiver module for optical communications 3 of the invention is completed.

In the transceiver module for optical communications 3 and the optical receptacle 1 including the optical component assembly pursuant to the invention, the she 8 which is readily detachable and replaceable can be secured to a projection 9d of the optical component assembly, and, the attachment, detachment, and replacement of the sleeve 7 are also easy. In removing foreign matters, the fiber stub 4 is uncovered by detaching the shell 8 and the sleeve 7 to make clean of internally adherent foreign matters thoroughly. Thus, there can be provided the optical receptacle 1 and the transceiver module for optical communications 3 that are capable of easy restoration of connectability.

It should be understood that the invention is not limited to the embodiments and practical examples described above, and thus many changes and modifications may be made therein without departing from the scope of the invention. For example, the above description deals with the embodiment of the optical component assembly adapted for the optical receptacle 1, but the invention is not limited to this. For example, the optical component assembly may be adapted for an optical receptacle unit having functional components such as a sleeve on the side toward an optical connector connected to the transceiver module for optical communications 3.

Moreover, the terms indicating directions including "upper", "lower", and "lateral" are used merely for explanation of positional relationships among constituent components in the drawings, and are thus not intended to represent actual positional relationships in practical use.

REFERENCE SIGNS LIST

1: Optical receptacle
2: Optical device housing portion
3: Transceiver module for optical communication
4: Light-guiding member (Fiber stub)
4a: One end
4b: Other end
5: Optical fiber
6: Cylindrical member
6a: One end
6b: Other end
6c: Outer periphery
6d: Projection
6e: Protrusion
6f: Chamfer
7: Sleeve
8: Shell
8a: Rear end
8b: Front end
8c: Groove
8d, 8e: Protrusion
8f: Marking region
9: Optical isolator
9a: Polarizer
9b: Faraday rotator
9c: Analyzer
10: Magnet
11: Package for optical communications
12a, 12b: Centering adapter

CITATION LIST

Patent Literature

Patent Literature 1: Japanese Unexamined Patent Publication JP-A 2001-66468

The invention claimed is:

1. An optical receptacle, comprising:
   an optical component assembly including:
   a light-guiding member;
   a cylindrical member which retains the light-guiding member in a through hole thereof; and
   a projection which is provided at one end of the cylindrical member so as to extend beyond an outer periphery of the cylindrical member, and is engageable in a groove which is formed in a cylindrical shell so as to extend in an axial direction of the cylindrical shell and then turn in a circumferential direction of the cylindrical shell;
   a sleeve disposed at a front end part of the light-guiding member; and
   a cylindrical shell which covers an outer periphery of the sleeve, and has a groove which is formed at a rear end part of the cylindrical shell so as to extend in the axial direction of the cylindrical shell and then turn in the circumferential direction of the cylindrical shell, wherein a protrusion is disposed on one end face of the cylindrical member,
the protrusion protrudes in an axial direction of the cylindrical member from the one end face,
the projection is placed at a side face of the protrusion,
the cylindrical shell is fixable by engagement of the groove with the projection, and
a rear end face of the sleeve abuts on a front end face of the protrusion, and a gap is present between the rear end face of the sleeve and one end face of the cylindrical member.

2. The optical receptacle according to claim 1, wherein the projection is placed in two or more locations which are symmetrical with respect to a center axis of the cylindrical member.

3. The optical receptacle according to claim 1, wherein at least part of a rear end face of the light-guiding member is an inclined face, and an inclination direction of the inclined face has a predetermined positional relationship with a protruding direction of the projection.

4. The optical receptacle according to claim 1, wherein an optical isolator is located on an optical path of the light-guiding member.

5. The optical receptacle according to claim 4, wherein a predetermined positional relationship is employed between the protruding direction of the projection and a direction of polarization plane of light transmitted through the optical isolator or a direction of polarization plane of light blocked by the optical isolator.

6. The optical receptacle according to claim 1, wherein the light-guiding member is a fiber stub in which an optical fiber is inserted into a ferrule.

7. The optical receptacle according to claim 1, wherein a gap is present between the outer periphery of the cylindrical member and an inner periphery of the cylindrical shell.

8. The optical receptacle according to claim 1, wherein a part of the groove which is turned in the circumferential direction of the cylindrical shell is an inclined groove which is away from a rear end face of the cylindrical shell with distance from a connection of the groove connected to a part of the groove which extends in the axial direction of the cylindrical shell to a distal end of the groove.

9. The optical receptacle according to claim 1, wherein the cylindrical shell is provided with a marking for identification.

10. The optical receptacle according to claim 9, wherein the marking is represented by a color different from a color of an appearance of the cylindrical shell.

11. The optical receptacle according to claim 9, wherein the marking is represented by a mark engraved in the cylindrical shell.

12. The optical receptacle according to claim 9, wherein the marking is represented by a color painted onto the cylindrical shell.

13. A transceiver module for optical communications, comprising:
the optical receptacle according to claim 1; and
an optical communications package secured to the cylindrical member, in the optical communications package being stored an optical device.

* * * * *